UNITED STATES PATENT OFFICE 2,690,956

PROCESS OF MAKING SODIUM CYANATE

William P. ter Horst, Lewiston, N. Y., assignor to Mathieson Chemical Corporation, a corporation of Virginia No Drawing. Application November 21, 1950, Serial No. 196,939

5 Claims. (Cl. 23—75)

This invention relates to a continuous process for manufacturing sodium cyanate from urea and soda ash which provides a commercial product of excellent purity, particularly with respect to cyanide content. Unlike potassium cyanate, sodium cyanate is not now a common article of commerce since methods proposed for manufacturing it such as the electrolytic or hypochlorite oxidation of sodium cyanide have not proved economically attractive.

Potassium cyanate has been manufactured and it has been proposed to make sodium cyanate by the reaction of urea with the alkali metal carbonate according to the following equation in which M represents an alkali metal:

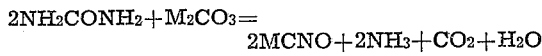

$$2NH_2CONH_2 + M_2CO_3 = 2MCNO + 2NH_3 + CO_2 + H_2O$$

The reactants are mixed and heated. The cyanate product is usually recovered from the solid reaction mixture by crystallidation from water. Yields by this batch process however are very low in the case of sodium cyanate manufacture and some additional loss by hydrolysis occurs during crystallization of the cyanate in the presence of water.

If the reaction mixture is heated to fusion temperature or above in an effort to promote the reaction, I have found that decomposition of the product occurs to an undesirable extent. Indeed with sodium cyanate, decomposition to the cyanide occurs to such an extent that yields of only 30 or 40 per cent are obtained. I have found however that excellent yields, i. e. 85 to 90 per cent and over may be obtained by heating the reaction mixture of urea and soda ash in particular proportions to fusion while removing liquid sodium cyanate as rapidly as possible from the reaction zone and cooling. Although the reaction appears to begin at approximately 85° C. and improves with increase in temperature, I have found that the decomposition reaction also increases with temperature and it is markedly accelerated as the period of reaction time is increased. The decomposition reaction also is promoted by oxygen and most metals. I have found however that by rapidly heating the reaction mixture to a clear melt or fused state, substantially complete reaction is obtained and the molten product can be rapidly removed and cooled so as to prevent serious decomposition. By clear melt or fused state, I mean the molten state obtained by application of sufficient heat to carry the reaction mixture through the stage where the urea is melted and the carbonate is suspended therein and through the subsequent stage where the urea melt and suspended carbonate has rehardened to a solid agglomerate.

According to my invention, urea and soda ash are mixed in the molar ratio of urea to soda ash of 2.0 to about 2.6 to 1. I prefer to use about 2.3 to 1. Lower proportions of urea lead to reduced yields and high proportions of urea are unnecessarily expensive and do not appear to contribute to an increased yield. Cyanide content of the product is raised either by more urea than about 2.6:1 or less than 2:1. The dry mixture of urea and soda ash is heated to fusion where it is maintained for a period not exceeding about 4 minutes. Advantageously, of course, the process is conducted continuously by adding solid urea and soda ash advantageously as a dry mixture to the reaction melt and controlling the rate of liquid sodium cyanate removal to limit its residence time in the reaction zone to not over 4 minutes. I have found that this time is very critical and that at the fusion temperatures, sodium cyanate in the fused mixture decomposes rapidly. Longer times are therefore to be avoided and shorter times are preferable. However, at lower temperatures somewhat longer times of fusion may be permissible and shorter times are essential at higher temperatures. For example, it is possible to heat carefully in fusion for as much as 5 minutes at 535° C. without serious decomposition, but the heating time should not exceed 2 or 3 minutes at temperatures over 600° C.

It is of the utmost importance to obtain the highest possible cyanate content and to discontinue the reaction as nearly as possible when the cyanate content is at its peak. At the same time it is essential that the lowest possible cyanide content be present because of its toxic properties. Prior to my invention these requirements could not be successfully met in a practical commercial process.

The mixture of urea and soda ash is heated to a minimum temperature at which the components form a clear fusion. This is about 525° C. but may vary slightly depending on the proportions of the components. The maximum temperature for the fusion which avoids excessive loss by decomposition is about 650° C. but I prefer to operate at lower temperatures. I prefer temperatures of about 525 to 575° C. At these temperatures, the mixture becomes fluid, and ammonia, carbon dioxide and steam are evolved. The urea melts first and a suspension of soda ash in molten urea is first formed which hardens before fusion to the clear melt. Care should be taken to prevent loss of the urea from the fused portion by sublimation or volatilization. At temperatures below the fusion point, reaction is slow and incomplete. At more elevated temperatures the decomposition of sodium cyanate is so serious as to make the manufacture unsatisfactory and to require recrystallization of the product to separate it from the soda ash reformed by decomposition. The reaction is controlled by limiting the period of time in the fused state to about 4 minutes or less and cooling the fused material below its solidification point as rapidly as possible. In order to promote good admixture and contact in initiating the reaction, it is desirable to employ the starting materials in finely ground or powdered form.

The process is conducted continuously, feeding the reactants to the reaction zone and removing the liquid reaction product therefrom so that at any one time, very little fused sodium cyanate is present in the reaction zone. As distinguished from batch processes known to the art, the yields are vastly improved and the quality of the product is so high that subsequent purification, previously necessary for many purposes, may be avoided. Operating according to my invention, snow white sodium cyanate may be obtained which contains a minimum of 85 per cent sodium cyanate and frequently as high as 95 per cent sodium cyanate. The balance is usually soda ash with a small portion, usually considerably less than 1 per cent of sodium cyanide. The evolved gases from the reaction zone advantageously are collected, converted to urea and thus returned to the process. The gases may be otherwise utilized, for example, by absorption of the ammonia in sulfuric acid, to make ammonium sulfate and by recovery of the carbon dioxide as such.

Sodium bicarbonate and sodium sesquicarbonate may be substituted for soda ash in the reaction mixture, using molecularly equivalent amounts, but I have found that other salts such as sodium bisulfate or sodium dihydrogen phosphate give little or no sodium cyanate as a product. The fusion temperature may be somewhat lowered by the admixture of minor amounts of potassium carbonate in place of part of the soda ash, yielding a product which is a mixture of sodium and potassium cyanates, if such a product is desired.

The apparatus employed therefore must be adapted to effect rapid heating and rapid removal of the fused salt from the reaction zone. For example, the solid mixture of urea and soda ash may be fed into the upper part of an inclined heated tube provided with means such as a screw conveyor for moving the solid through the tube as rapidly as possible into the heated center zone of the tube and arranged so that the fused liquid flows immediately into the lower and cooler part of the tube and out of the tube. In this way moisture contained in the starting materials is driven off as the urea melts (85° to 120° C.) and the reaction mixture is rapidly raised to the final fusion temperature just before the point of exit from the reaction zone. In another suitable apparatus, a shallow pan or dish is heated from below by direct fire and a fused mixture is maintained in the dish. The mixture of urea and soda ash is sprinkled or otherwise fed at an appropriate rate to the fusion, for example, from a star feeder, and the dish is arranged so that the fluid flows from one edge and out of the reaction zone. A small layer of fusion is maintained in the dish. Any other suitable apparatus which makes it possible to heat the reaction mixture and to remove the fusion quickly from the reaction zone may be used. The maximum time limit of four minutes in the fused state should, however, not be exceeded for best results.

The apparatus used should be constructed of materials resistant to the reaction mixture at the temperatures employed and which will not promote decomposition of the cyanate. Nickel and alloys containing large proportions of nickel may be used but iron vessels are generally not as satisfactory since they discolor the product. Iron and its compounds appear to catalyze the decomposition of sodium cyanate and prevent the manufacture of the desired product in satisfactory yields. Ceramic vessels may be used but are less satisfactory because of their poor heat transfer characteristics.

Typical operating conditions are illustrated in the following examples, but obviously, the examples are not intended to be limiting with respect to the procedure or equipment described.

*Example I*

A powdered mixture of 2.3 mols of urea and 1 mol of sodium carbonate was added in portions from time to time to a nickel vessel having a spout at the bottom. The powdered mixure was added at such a rate that the beaker was always filled with the solid and it was kept pushed down into the beaker. Heat was supplied to the vessel by means of gas fires and the fusion, as fast as formed, flowed from the spout and into a suitable container. A total of several pounds of mixture was fed through the crucible in this way and the resulting product showed on analysis 92.30 per cent of sodium cyanate and 1.35 per cent of sodium cyanide.

*Example II*

Using a direct fired flat nickel pan about one foot in diameter and arranged with an outlet tube on one side to maintain a melt level of about ⅛-inch in the pan, several runs were made in which a solid mixture of urea and soda ash comprising from 2.3 to 2.9 mols of the former per mol of the latter was fed at rates of 7.5 to 16.1 pounds per hour through a screen on the surface of the fusion which was maintained at a temperature of 550° C. The residence time in fusion was about 3 minutes. The products of these runs contained an average of about 95–96 per cent NaOCN, about 0.54 to 0.88 per cent NaCN and 2–6 per cent $Na_2CO_3$. The product was removed from the fusion at the rate of about 5 to 10 pounds per hour.

In contrast to the high yields obtained under these typical operating conditions, only 8.30 per cent sodium cyanate yield was obtained by reacting a 1:1 mol ratio of urea and sodium carbonate in an autoclave for ½ hour at 200° C., and only 36 per cent sodium cyanate yield was obtained by fusing a 2.5:1 mol ratio of urea and sodium carbonate at 185° C. with the completion of frothing which required 10 minutes.

*Example III*

The importance of proper proportioning of the molar ratio of urea to sodium cyanate is shown by this example. A nickel fusion pot in the form of a flat bottomed dish of nickel sheet ⅛-inch in thickness was heated from below by a furnace. The diameter of the dish was 12 inches and its depth was 3 inches. The urea and soda ash crystals were finely ground and thoroughly mixed in a blender before charging to the fusion pot.

The mix was added intermittently to the pan in small lots of two to three pounds and a heaping salt level of three to four inches was maintained in the pan during the run. The molten product flowed by gravity to a ¼-inch nickel spout located at the edge of the pan and then was collected on a jacketed nickel pan cooled by water. The following data show the effect of variations in the molar ratio of urea to sodium carbonate when the residence time in fusion was 3 minutes or less:

| Urea/$Na_2CO_3$, Moles | NaOCN Percent | NaCN Percent |
|---|---|---|
| 2.0 | 84.2 | 2.6 |
| 2.3 | 95.9 | 0.7 |
| 2.6 | 95.0 | 2.5 |
| 2.9 | 96.0 | 6.8 |

*Example IV*

A nickel pan was employed having straight sides and a conical bottom with an angle of 20° with the horizontal. The molten salt was discharged from the center of the pan through a nickel spout. The furnace was a cubical firebrick box heated by a gas burner. A mixture of urea and sodium carbonate in the molar proportions of 2.3 to 1 was fed to the heated pan and the fusion ran from the apparatus as fast as formed. On solidification the product showed 95.7% sodium cyanate, 0.7% sodium cyanide and 3.0% of sodium carbonate. A yield of 0.63 parts of product was obtained per part of mixture charged.

Thus my invention provides a process for obtaining high quality sodium cyanate in high yield from a source of urea and a carbonate of soda. It is characterized by very rapid reaction in the fused state at a temperature of 525° C. and above but requires rapid removal of the cyanate product from the reaction zone in order to limit the reaction time in the fused state to not more than about 4 minutes, limitation of the molar ratio of urea to soda ash to between about 2 and 2.6 to 1 and the limitation in temperature to less than 650° C. In this way products high in cyanate but of minimum harmful cyanide content are obtained.

I claim:

1. The method of manufacturing sodium cyanate which comprises heating urea and a carbonate of soda admixed in the ratio of about 2 to 2.6 moles of urea per mole of the carbonate in the fused state at a temperature within the range of about 525° to 650° C., limiting the reaction time in the fused state to not more than about 4 minutes, cooling the fused material and recovering the sodium cyanate product.

2. The method of manufacturing sodium cyanate which comprises heating urea and soda ash admixed in the ratio of about 2.3 moles of urea per mole of soda ash in the fused state at a temperature within the range of about 525° to 650° C., limiting the reaction time in the fused state to not more than about 4 minutes, cooling the fused material and recovering the sodium cyanate product.

3. The method of manufacturing sodium cyanate which comprises heating urea and a carbonate of soda admixed in the molar ratio of about 2.3 moles of urea to one mole of the carbonate in the fused state at a temperature within the range of 525° to 575° C., limiting the reaction time in the fused state to not more than about 3 minutes, cooling the fused material and recovering the sodium cyanate product.

4. The method of manufacturing sodium cyanate which comprises continuously charging a mixture of urea and soda ash in the ratio of about 2 to 2.6 moles of urea per mole of soda ash to a reaction zone, heating the mixture in the reaction zone to fusion at a temperature within the range of about 525° to 650° C., withdrawing fused product at a rate limiting the time within the reaction zone to not more than 4 minutes, cooling the fused material and recovering the sodium cyanate product.

5. The method of manufacturing sodium cyanate which comprises continuously charging a mixture of urea and soda ash in the ratio of about 2.3 moles of urea per mole of soda ash to a reaction zone, heating the mixture in the reaction zone to fusion at a temperature within the range of about 525° to 575° C., withdrawing fused product at a rate limiting the time within the reaction zone to not more than 3 minutes, cooling the fused material and recovering the sodium cyanate product.

References Cited in the file of this patent

UNITED STATES PATENTS

| Number | Name | Date |
|---|---|---|
| 1,915,425 | Kloepfer | June 27, 1933 |
| 1,971,009 | Konig | Aug. 21, 1934 |
| 2,345,826 | Neumark | Apr. 4, 1944 |
| 2,546,551 | Lento, Jr. | Mar. 27, 1951 |

FOREIGN PATENTS

| Number | Country | Date |
|---|---|---|
| 39,282 | France | Oct. 12, 1931 |
| 713,520 | France | Oct. 29, 1931 |
| 590,232 | Germany | July 11, 1930 |
| 339,220 | Great Britain | Dec. 4, 1930 |
| 339,371 | Great Britain | Dec. 11, 1930 |
| 359,559 | Great Britain | Oct. 26, 1931 |

OTHER REFERENCES

Scattergood: "Inorganic Synthesis" by Fernelius, vol. II, pages 86–89, McGraw-Hill Book Co., N. Y. C. (1946).